UNITED STATES PATENT OFFICE.

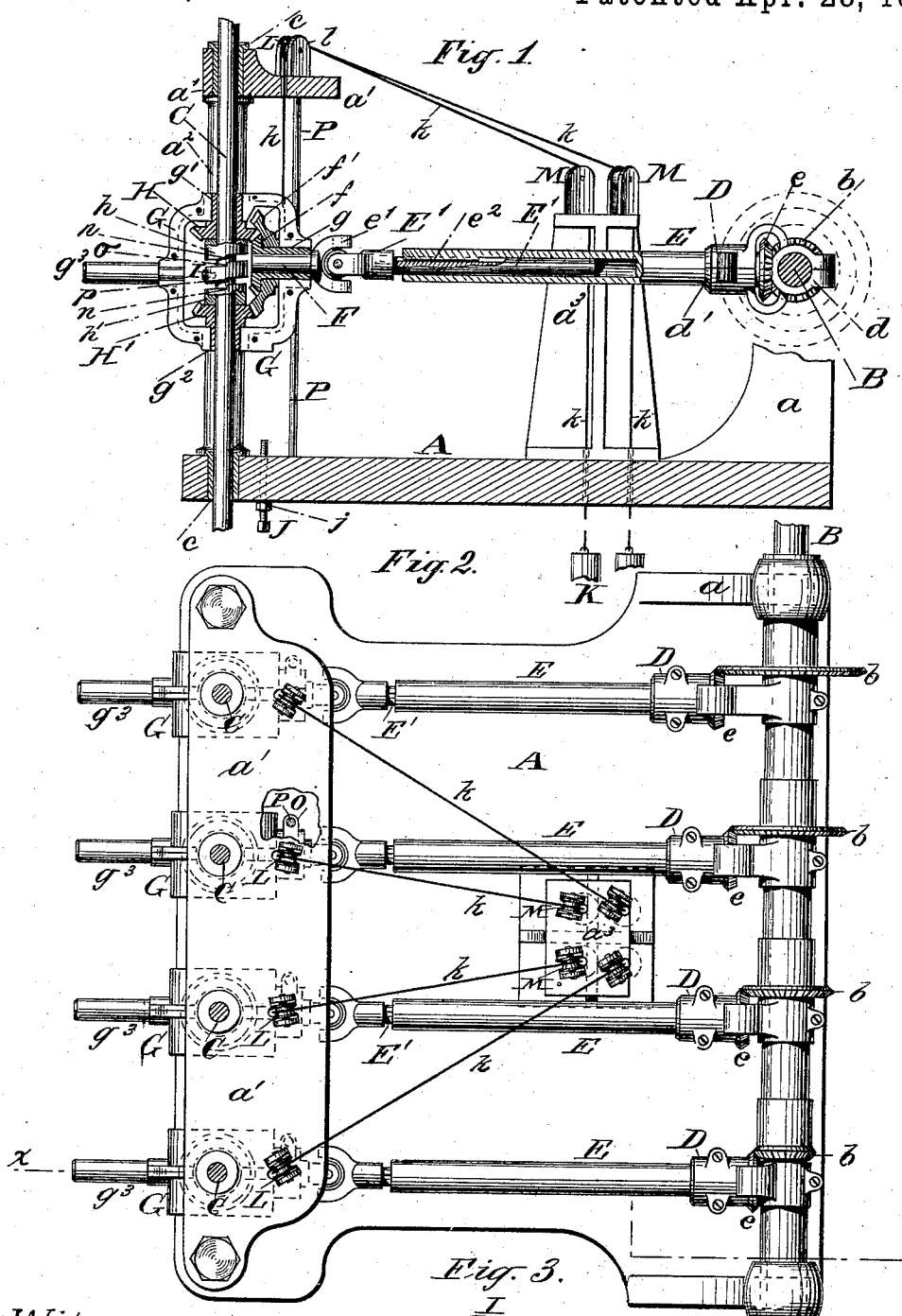

EDWARD N. ANDREWS, OF RUTHERFORD, NEW JERSEY.

SCREW-THREADING MACHINE.

SPECIFICATION forming part of Letters Patent No. 316,720, dated April 28, 1885.

Application filed November 9, 1883. (No model.)

*To all whom it may concern:*

Be it known that I, EDWARD N. ANDREWS, a citizen of the United States, and a resident of Rutherford, in the county of Bergen and State of New Jersey, have invented certain new and useful Improvements in Thread-Cutting Machines, of which the following is a specification.

My invention relates to tapping-machines for cutting screw-threads in or on metal or other material where such may be required; but it is also applicable to drilling-machines.

The object of my invention is to obviate the disadvantages of tapping-machines heretofore made; to make the spindle movable to any distance required to enable the tap carried by it to reach and feed to the work, instead of moving the table or support holding the work, with all the combined weight of both, to the tap to reach and feed to the latter; to automatically reverse the motion of the spindle to withdraw or unscrew the tap, and to impart such reverse motion more rapidly than the tapping motion is given, and thus to provide a machine more expeditious in operation, more saving of time and labor, and capable of a greater variety and range of work.

My invention therefore consists in the combination with a drilling or tapping spindle, of certain mechanical devices adapted to permit of such spindle being moved through or over any required distance to reach and perform the work; also, in the combination, with a drilling or tapping spindle, of certain mechanical devices adapted to automatically reverse the motion of such spindle; also, in the combination, with a drilling or tapping spindle, of certain mechanical devices adapted to impart to the spindle a reverse motion at increased speed while withdrawing the drill or tap; also, in certain other features of construction and of arrangement, the nature of which will be more fully hereinafter set forth.

In the accompanying drawings, Figure 1 represents a vertical section of my improved tapping-machine, the section being taken on line $x\ x$ of Fig. 2. Fig. 2 is a plan view of the same. Fig. 3 is a detail section of the spindle and clutch-collar, showing the manner in which the latter is secured upon the former.

The frame of the machine consists of a bed-plate, A, having brackets $a$, provided with bearings in which the horizontal driving-shaft B is mounted; a plate, $a'$, supported above the bed-plate A by vertical posts or columns $a^2$, and a stand, $a^3$, supporting the guide-pulleys for the cords of weights by which the spindle-wheel frames are counterbalanced. C is the spindle by which the threading-tap is held. The spindle is arranged to slide vertically in bearings or thimbles $c$, fitted in holes through the plates A and $a'$. The upper end of the thimbles $c$ are flanged and concaved, so as to serve as oil-cups for lubricating the spindles. Preferably, the spindles are arranged in sets, as shown in Fig. 2, connected to be revolved by gear-wheels of different sizes mounted on the same driving-shaft B, so as to regulate the speed of the separate spindles according to the size of the tap used. The construction of spindles (and machinery by which they are run) being exactly alike, a description of one will apply to the others.

Motion from the bevel-wheel $b$ upon the shaft B is transmitted to the spindle in the following manner: A coupling or yoke, D, made in the two halves, and having bearings at right angles to each other, is clamped by its bearing $d$ upon the shaft B, so as to swing freely upon the latter, and by its bearing $d'$ upon a hollow shaft, E, having the bevel cog-wheel $e$ upon its end, in such a manner that the said wheel $e$ meshes with the wheel $b$, so as to always revolve together with the latter, whatever be the inclination of the shaft E to the horizontal, the said shaft being free to assume any inclined position to the horizontal by the turning of the bearing $d$ upon the shaft B, the point of contact between the wheel $e$ and wheel $b$ never being lost.

Within the hollow shaft E is fitted to slide the shaft E', one end of which, by a universal joint, $e'$, is connected to the shaft F of two bevel-wheels of different sizes, $f f'$, the said shaft being fitted to revolve in a bearing in the frame G, as shown in Fig. 1. The shaft E' is grooved along is surface, and a feather, $e^2$, on the inside of the shaft E, enters into said groove, thus allowing the shaft E' to slide and serve as an elongation of the shaft E when the latter assumes a more or less inclined position, but preventing the shaft E' from turning independently of the shaft E.

The frame G is made in two halves bolted together in a manner similar to the yoke D, and has, in addition to the horizontal bearing $g$, in which the aforesaid shaft F revolves, two vertical bearings, $g'$ $g^2$, in which are mounted to revolve, by their hubs, two bevel-wheels, H H', arranged upon the spindle C, one above and one below a clutch-collar, I, secured and adjustable on the spindle C. The upper cog-wheel, H, gears with the cog-wheel $f$ to turn the spindle during the downward movement of the tap, and the lower wheel, H', gears with the larger wheel $f'$, to turn the spindle in the opposite direction for unscrewing or withdrawing the tap. The collar I is provided on the inside with a feather, $i$, fitting into a groove on the spindle C, so that a turning of this collar will compel the spindle to turn with it, and the collar may be slid along in any position upon the spindle, so as to regulate the depth or elevation of the spindle, and when so adjusted in proper position the collar I is then prevented from sliding by means of a set-screw, $i'$. (See Fig. 3.) The spindle-wheel frame G may be raised or lowered at will by the handle $g^3$. The cog-wheels H H' are provided with annular bosses, $h$ $h'$, formed on or secured to them, respectively. The end faces of these bosses opposite the respective end faces of the collar I are clutch-shaped, with stops or shoulders $m$ $n$, respectively, for movement in opposite directions, and the said opposite end faces of the clutch-collar I have corresponding stops and shoulders $o$ $p$.

J is an adjustable stop-screw passing from the under side vertically through the bed-plate A, and provided with a tightening-nut, $j$, to prevent it from being turned accidentally. The object of this screw J is to stop the movement of the spindle-wheel frame G, and thus to limit the vertical movement of the spindle, and also for automatically reversing the motion of the spindle, as in the description of the operation will presently appear.

The weight of the spindle C, frame G, wheels H H' and $f$ $f'$, universal joint $c'$, and that portion of the weight of shaft E' E not supported by the shaft B are counterbalanced by the weight K, attached to one end of a cord, $k$, whose other end is attached to the upper end of the frame G, as seen in Fig. 1, and which cord from said frame runs up through the plate $a'$ over a pulley, L, pivoted between lugs $l$ upon the said plate, and thence runs over a similar pulley, M, between similar lugs upon the bracket $a^3$. This counterbalancing may be just enough to require the gentle aid of the operator to raise or depress the frame G by the handle $g^3$; or, as may sometimes be desirable, it may be slightly underbalanced to require such aid only in raising the frame; or, for the purpose of automatically reversing the motion of the spindle, as I prefer it, it should be slightly overbalanced, so that such aid is needed to depress the frame, and when released from that pressure the frame will be raised by the weight.

To prevent the frame G from turning laterally or upon the spindle by the resistance of the tap, the said frame is provided with one or more horizontal lugs, O, having vertical holes through them, by which it fits upon and is guided by a vertical guide-rod, P, secured to and between the plates A $a'$.

The operation is as follows: For the downward movement, the handle $g^3$ is depressed to put the boss or collar $h$ of the upper wheel, H, in clutching contact with the ring I. The wheel H, revolved by the wheel $f$, will then turn the spindle, the lower wheel, H', in the meantime revolving loosely. When the spindle has descended far enough to cause the lower edge of the frame G to strike against the stop-screw J, it is evident that further descending of the frame G is prevented, while the spindle still keeps turning and advancing downward, according to the pitch of the thread. The frame G being temporarily stationary while the spindle still descends, the shoulder $o$ will slip off from the shoulder $m$, and (the spaces between the collars being properly arranged) the lower shoulder, $p$, of the collar I will engage the shoulder $n$ of the boss or collar $h'$, and the spindle will be revolved by the wheel H' in the opposite direction, thus unscrewing the tap from the threaded hole.

A single bevel gear or wheel, instead of the wheels $f$ $f'$, meshing with the wheels H H', would turn the latter at like speed in opposite directions; but, in order to waste as little time as possible in the comparatively light work of unscrewing the tap, I prefer to employ two wheels of unequal diameter, and hence the wheel $f'$, from which the wheel H' receives its motion, is of a much larger size than the latter wheel, thus effecting a more rapid upward than downward movement of the spindle. It is obvious that this more rapid movement in one direction by the use of two bevel gears or wheels of unequal diameters for driving, instead of one bevel gear or wheel, would also be effected if the frame G were stationary instead of movable.

The shoulders on the collars, when as shown in Fig. 1, are arranged for cutting left-handed threads, (or right-handed if the tap were fastened on the upper end of the the spindle.) Reversing the position of the shoulders will of course adapt them for cutting right-handed threads.

Having thus described my invention, I claim as new and desire to secure by Letters Patent—

1. In a tapping or drilling machine, the combination, with the spindle, of an adjustable clutch-collar secured thereon in substantially the manner described, whereby the spindle is capable of being moved through the collar without turning therein.

2. In a tapping or drilling machine, the combination, with the spindle and clutch mechanism, of a reciprocally-movable frame or head, and gears carried by said frame and adapted to revolve the spindle, substantially as set forth.

3. In a tapping or drilling machine, the combination, with the spindle and clutch mechanism, of a reciprocally-movable frame or head, reversibly-operating gears carried by the frame or head and adapted to revolve the spindle alternately in opposite directions, substantially as set forth.

4. In a tapping or drilling machine, the combination, with a frame or head, and a spindle carried thereby, of a central clutch mechanism, and four gear-wheels, two of which are carried by an extensible shaft provided with a universal joint, as herein set forth.

5. In a machine of the kind described, the combination of a frame, a revoluble spindle carried thereby, a central clutch with loose gears having clutch devices, and located above and below said clutch, and means for revolving the spindle, as herein set forth.

6. In a tapping or drilling machine, in combination with the spindle, a reciprocally-movable frame or head carrying the same, and provided with gears of unequal diameters, and intermediate mechanism adapted to transmit to the spindle rotary motion in alternately-opposite directions at greater speed in one direction than the other, substantially as set forth.

7. In a tapping or drilling machine, the combination, with two driven bevel-gears, of two driving bevel-gears of unequal diameters and adapted to revolve the former in opposite directions at the same time, but at different speeds, substantially as and for the purpose set forth.

8. In a tapping or drilling machine, the combination, with the spindle, a reciprocally-movable frame carrying the same, and the motion-transmitting devices, of a weight suitably attached to said frame and adapted to counterbalance the same, substantially as set forth.

9. In a tapping or drilling machine, the combination, with the spindles a reciprocally-movable frame or head carrying the same, and the motion-transmitting devices, of a weight suitably attached to said frame and adapted to sufficiently overbalance the same to raise it when released from downward-applied pressure, substantially as set forth.

10. The combination, in a drilling or tapping machine, of a movable head or frame, a spindle extending through the same, a clutch and bevel gears on the spindle, an extensible shaft provided with a universal joint and gear-wheels thereon adapted to engage with the wheels on the spindle, as set forth.

11. The combination, in a drilling or tapping machine, of a movable head or frame, a spindle extending through the same, a clutch and bevel-gears on the spindle, an extensible shaft having a universal joint, and two bevel-gears of unequal diameters adapted to engage with the gear-wheels on the spindle, whereby the same is rotated and moved in a vertical line at different speeds, all as set forth.

12. In a tapping or drilling machine, the combination, with the main shaft and the drilling mechanism, of a coupling or yoke adapted to swing freely thereon during the operation of the drill, an extensible secondary shaft carried by the yoke and connected with the drilling mechanism, and intermediate gears between the main and secondary shaft, all substantially as set forth.

13. The combination of the revoluble sliding spindle having clutch-collar I, secured from turning thereon, but longitudinally movable on the spindle, the wheels H H', arranged at opposite sides of the said collar to turn freely upon the said spindle, and having devices for forming clutch-contact with the said collar, and means, substantially as described, causing the said wheels to revolve in opposite directions, for the purpose hereinbefore set forth.

14. The combination of the revoluble sliding spindle C, having the clutch-collar I, adjustable, but secured from turning thereon, the sliding frame G, provided with the clutch-carrying gear-wheels H H', revoluble on the spindle, and the wheels $f f'$, gearing with the aforesaid wheels H H', the extensible shaft E E', connected by a universal joint to the shaft of the said wheels $f f'$, the yoke D, cog-wheels $e b$, and shaft B, substantially as and for the purpose set forth.

15. The combination of the revoluble sliding spindle C, having the clutch-collar I, and the sliding frame G, provided with the clutch-carrying gearing-wheels H H', revoluble upon the said spindle by a wheel or wheels, $f f'$, with the adjustable stop J, substantially as and for the purpose set forth.

16. The combination, with the spindle C, spindle-wheel frame G, shafts E E', yoke D, and shaft B, of the cord or chain $k$ and weight K, the said cord being attached to the said sliding frame G and running over pulleys L M, and the said weight being just heavy enough to counterbalance that portion of the said spindle-frame wheels and shafts not supported on the shaft B, as and for the purpose set forth.

17. In a tapping-machine, the combination of a spindle, C, having a longitudinal way or groove, with a clutch-collar, I, having a feather, $i$, entering the said groove, and provided also with a set-screw, $i'$, for adjusting its position longitudinally upon the shaft, while preventing it from turning, and thus adjusting the elevation of the spindle, substantially as specified.

18. In a tapping or drilling machine, the combination, with the spindle and clutch mechanism, of a reciprocally-movable frame or head-gears carried by said frame for imparting rotary movement to the spindle, and a guide for the frame, whereby it is maintained in proper position throughout its path of movement, as set forth.

In testimony that I claim the foregoing as my invention I have signed my name, in presence of two witnesses, this 2d day of November, 1883.

EDWARD N. ANDREWS.

Witnesses:
A. W. ALMQVIST,
ROBT. W. MATTHEWS.